United States Patent [19]
Miller

[11] Patent Number: 5,930,232
[45] Date of Patent: Jul. 27, 1999

[54] METHOD AND SYSTEM FOR IMPLEMENTING A PROTECTION SWITCHING PROTOCOL

[75] Inventor: Douglas W. Miller, Richardson, Tex.

[73] Assignee: Alcatel Network Systems, Inc.

[21] Appl. No.: 08/612,982

[22] Filed: Mar. 1, 1996

[51] Int. Cl.$^6$ .................................. H04J 1/16; H04J 3/16
[52] U.S. Cl. ............................................ 370/216; 370/465
[58] Field of Search ..................................... 370/216, 217, 370/218, 219, 220, 241, 354, 465, 242, 244, 246, 250, 228, 351, 463, 359

[56] References Cited

U.S. PATENT DOCUMENTS

| | | | |
|---|---|---|---|
| 4,451,916 | 5/1984 | Casper et al. | 370/16 |
| 5,159,595 | 10/1992 | Flanagan et al. | 370/224 |
| 5,335,105 | 8/1994 | Carlton | 359/135 |
| 5,343,464 | 8/1994 | Iino et al. | 370/16 |
| 5,355,362 | 10/1994 | Gorshe et al. | 370/358 |
| 5,365,510 | 11/1994 | Nicholson et al. | 370/16 |
| 5,408,462 | 4/1995 | Opoczynski | 370/16 |
| 5,455,832 | 10/1995 | Bowmaster | 371/20.1 |
| 5,479,608 | 12/1995 | Richardson | 395/182.02 |
| 5,570,345 | 10/1996 | Kaprielian et al. | 370/16 |
| 5,663,949 | 9/1997 | Ishibashi et al. | 370/220 |
| 5,784,377 | 7/1998 | Baydar et al. | 370/463 |
| 5,815,490 | 9/1998 | Lu | 370/223 |

OTHER PUBLICATIONS

Draft American National Standard for Telecommunications "Synchronous Optical Network (SONET): Operations, Administration, Maintenance, and Provisioning (OAM&P) Communications Protection Switching Fragment."

*Primary Examiner*—Huy D. Vu
*Assistant Examiner*—Chiho Andrew Lee
*Attorney, Agent, or Firm*—Gray Cary Ware & Freidenrich LLP

[57] ABSTRACT

Method and system for implementing a protection switching protocol of a telecommunications network (14). The method and system employs a protection object (80) including a set of attributes (84) and a set of functions (86) in communication with the attributes (84). The attributes (84) may store switching state information of the telecommunications network (14). The functions (86) may include a set of service functions (88) and a set of private functions (90). The service functions (88) may accept switching state information of the telecommunications network (14), store that information to the attributes (84) and retrieved that information from the attributes (84). The private functions (90) may also retrieved switching state information from the attributes (84). The private functions (90) may be invoked by a service function (88) or by another private function (90). Together, the service functions (88) and the private functions (90) implement the predefined protection switching protocol and invoke a set of system functions (100). The system functions (100) effect switching operations of the telecommunications network (14).

12 Claims, 2 Drawing Sheets

METHOD AND SYSTEM FOR IMPLEMENTING A PROTECTION SWITCHING PROTOCOL

TECHNICAL FIELD OF THE INVENTION

The present invention relates generally to the field of telecommunications and data processing, and more particularly to an improved method of, and system for, implementing a protection switching protocol.

BACKGROUND OF THE INVENTION

Telecommunication systems are electromagnetic-based systems that enable information to be communicated over large geographical areas. Such information includes written or printed matter, visual signals such as fixed or motion pictures, audio signals such as music, and the like.

A conventional telecommunication network includes a plurality of network elements distributed over a large area and connected by a transmission medium. The transmission medium may be copper wire, coaxial cable, fiber optics, radio or microwave, or a combination of these and other mediums.

The network elements are typically connected to local termination equipment by regional networks. Termination equipment accepts a user's voice and other information and transforms them into electromagnetic signals suitable for transmission over the regional network. Examples of termination equipment include telephones, computer modems, facsimile machines and video conferencing equipment.

Network elements generally comprise transmission equipment and switching equipment. Transmission equipment accepts regional signals and changes them appropriately for transmission over the medium. To superimpose signals onto the medium, the transmission equipment may modulate a carrier signal. Additionally, transmission equipment often multiplexes a large number of signals over the medium. Switching equipment provides interconnectivity between network components by routing information over the network. Switching equipment is typically computer-controlled and contains electronic switching matrices.

To account for equipment failure, network elements also include protection switching subsystems and redundant transmission and switching equipment. Protocols for regulating protection switching actions are established by industry standards, such as the Automatic Protection Switching (APS) protocol defined by Bellcore. Typically, a protocol is implemented by providing a unique control program that conforms to the specific equipment of a telecommunications system. Such customization of control programs for specific telecommunications systems, however, is expensive. Therefore, there exists a need in the art for an improved method and system for implementing a protection switching protocol in a telecommunications system.

SUMMARY OF THE INVENTION

In accordance with the present invention, a method and system for implementing a protection switching protocol is provided that substantially eliminates or reduces the disadvantages and problems associated with prior protection switching systems.

In accordance with the present invention, a system-independent protection object is provided to implement a predefined protection switching protocol. The protection object comprises a set of attributes and a set of functions in communication with the attributes. The attributes store switching state information of a telecommunications system. The functions include a set of service functions and a set of private functions. The service functions may accept switching state information of the telecommunications system, store that information to the attributes and retrieved that information from the attributes. The private functions may also retrieved switching state information from the attributes. The private functions may be invoked by a service function or by another private function. Together, the service functions and the private functions implement the predefined protection switching protocol and invoke a set of system functions. The system functions effect switching operations of the telecommunications system.

More specifically, a protection switching subsystem may be provided that includes an interface for communicating between the telecommunications system and the protection object. The interface may include a task and the set of system functions. The task may accept switching state information and switching events from the telecommunications system. The task may pass switching state information to the protection object and may invoke functions of the protection object associated with the switching events. The system functions may effect switching operations of the telecommunications system.

In accordance with one embodiment of the present invention, the protection object implements the 1+1 mode of the Automatic Protection Switching (APS) protocol defined by Bellcore for a Synchronous Optical Network (SONET). In this embodiment, the protection object processes switching events in accordance with the switching state of the telecommunications system, including operator requested states. Operated requested states may include manual switch to a working or a protect line, forced switch to a working or a protect line, lockout, or exercise.

Important technical advantages of the present invention include providing a protection object of modular design for implementing a predefined protection switching protocol. In particular, the protection object need not be customized for use with different types of telecommunications systems. Accordingly, the present invention provides a relatively inexpensive protection object by eliminating the cost of such customization.

Another important technical advantage of the present invention includes providing a simplified interface for communicating between the telecommunications system and the protection object. In particular, the complexities of a switching protocol are completely encompassed by the protection object. Thus, the interface is greatly simplified and need only provide communications between the telecommunications system and the protection object.

Other technical advantages will be readily apparent to one skilled in the art from the following figures, descriptions, and claims.

BRIEF DESCRIPTION OF THE DRAWINGS

For a more complete understanding of the present invention, and advantages thereof, reference is now made to the following description taken in conjunction with the accompanying drawings, in which.

DETAILED DESCRIPTION OF THE INVENTION

The preferred embodiments of the present invention and its advantages are best understood by referring now to FIGS.

Figure 1:
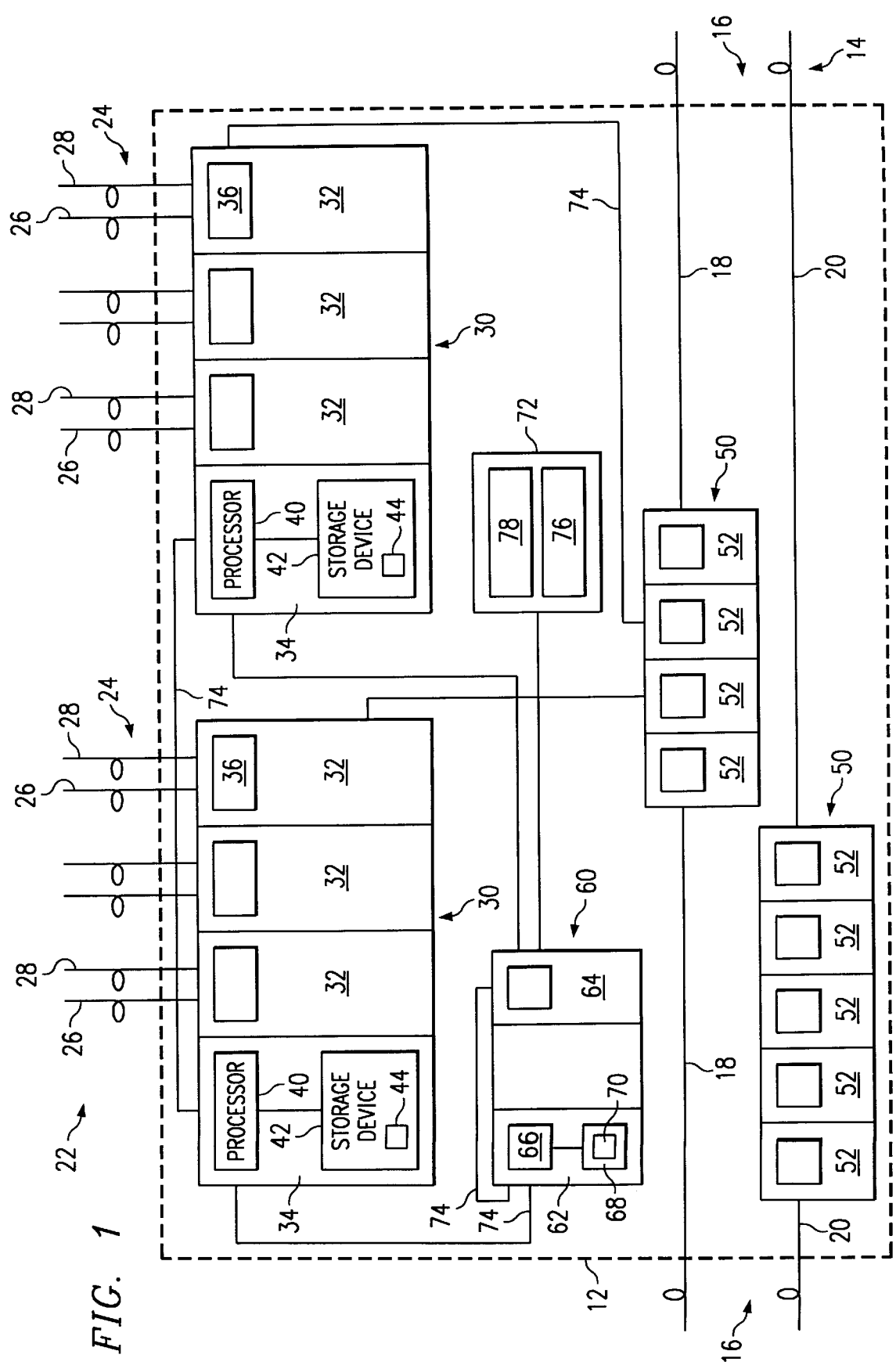
FIG. 1 is a block diagram of a network element having a protection switching subsystem using a protection object in accordance with the present invention.

1 through 2 of the drawings, in which like numerals refer to like parts throughout the several views. FIG. 1 shows a schematic block diagram of a network element 12 for receiving, processing, and transmitting information over a telecommunications network 14.

As shown by FIG. 1, the network element 12 communicates over the network 14 through a pair of communication links 16. The communication links 16 may be formed of high rate fiber optic cable that transmits information up to about 10 Gigahertz. Those skilled in the art will understand that the communication links 16 may also be formed of copper wire, coaxial cable, other types of fiber optic cable, radio or microwave, or a combination of these and other transmission mediums. Each communication link 16 may include a working line 18 to transmit information and a protect line 20 to provide back-up in case of failure of the working line 18.

The network element 12 may be connected to local termination equipment by a regional network 22. Termination equipment accepts a user's voice and other information and transforms them into electromagnetic signals suitable for transmission over the regional network 22. Examples of termination equipment include telephones, computer modems, facsimile machines and video conferencing equipment.

The regional network 22 may communicate with the network element 12 through a series of regional communication links 24. The regional communication links 24 may be formed of low rate fiber optic cable that transmits information up to about 600 Megahertz. Those skilled in the art will understand that the regional communication links 24 may also be formed of copper wire, coaxial cable, other types of fiber optic cable, radio or microwave, or a combination of these and other transmission mediums. Typically, for the fiber optic cable, radio or microwave mediums, each of the regional communication links 24 includes a working line 26 to transmit information and a protect line 28 to provide back-up in case of failure of the working line 26.

The regional communication links 24 may be received in the network element 12 by a plurality of tributary shelves 30. The tributary shelves 30 may each comprise a set of data path modules 32 and a control module 34. Each data path module 32 may include a processor 36 to monitor processing chips of the module for failures and to control switching operations of the module. The processor 36 reports a failure to the control module 34 through a system bus of the tributary shelf 30.

The control module 34 of a tributary shelf 30 may include a main processor 40 and a system memory 42 in communication with the main processor 40. The system memory 42 includes, as explained below in detail, a protection switching subsystem 44 in accordance with the present invention. The protection switching subsystem 44 of each tributary shelf 30 implements a predefined protection switching protocol for the communication links and for the data path modules of the shelf 30.

The tributary shelves 30 may process signals received from the regional network 22 and pass the signals to a pair of line shelves 50 for further processing and transmission over the telecommunications network 14. Similarly, the tributary shelves 30 may process signals received from the line shelves 50 and pass the signals to the regional network 22.

The line shelves 50 comprise a plurality of data path modules 52. Each data path module 52 may include a processor 54 to monitor multiplexing and processing chips of the module for failures. The processor 54 may also control switching operations of the data path module 52.

The line shelves 50 may be coupled to the network communication links 16. Signals received from the tributary shelves 30 may be multiplexed by the data path modules 52 of the line shelves 50 and transmitted over the communication link 16. Signals received from the communication link 16 may be demultiplexed by the line shelves 50 and any regional signals extracted. The remaining signals may then be re-multiplexed and transmitted over the communication link 16. The regional signals may be passed to the tributary shelves 30 for processing and transmission over the regional network 22.

The line shelves 50 may be controlled by a common shelf 60. The common shelf 60 may include a control module 62 and a user interface 64. The control module 62 may have a main processor 66 in communication with a system memory 68. The system memory 68 includes, as described below in detail, a protection switching subsystem 70 in accordance with the present invention. The protection switching subsystem 70 of the common shelf 60 implements the predefined protection switching protocol for the communication links 16 and for the data path modules 52.

The user interface 64 of the common shelf 60 may be directly coupled to an operator station 72 by a serial RS-232 connection. The operator station 72 may include an input device 76 for receiving operator switching request and a display device 78 for informing an operator of equipment failures. A local area network (LAN) 74 may couple the user interface 64 to the control module 62 of the common shelf 60 and to the control modules 34 of the tributary shelves 30. Accordingly, the operator station 72 may pass switching request to any of the control modules and may display equipment failures from all of the control modules.

According to a specific embodiment of the present invention, the tributary shelves 30 may comprise up to eight shelves manufactured by Alcatel Network Systems, 1225 N. Alma Road, Richardson, Tex. 75081, (214)996-5000. The line shelves 50 may comprise two shelves manufactured by Alcatel Network Systems, 1225 N. Alma Road, Richardson, Tex. 75081, (214)996-5000. Under this embodiment, the regional communications links 24 may comprise 256 fiber optic cables, which are capable of transmitting information at about 50, 150, or 600 Megahertz. The communications links 16 may comprise eight fiber optic cables, which are capable of transmitting information at about 2,500 or 10,000 Megahertz. The common shelf 60 may be manufactured by Alcatel Network Systems, 1225 N. Alma Road, Richardson, Tex. 75081, (214)996-5000. Additionally, the operator station 72 may be a personal computer (PC) having a 486, 386, or Pentium type processor, such as that manufactured by "COMPAQ COMPUTER, INC."

Figure 2:
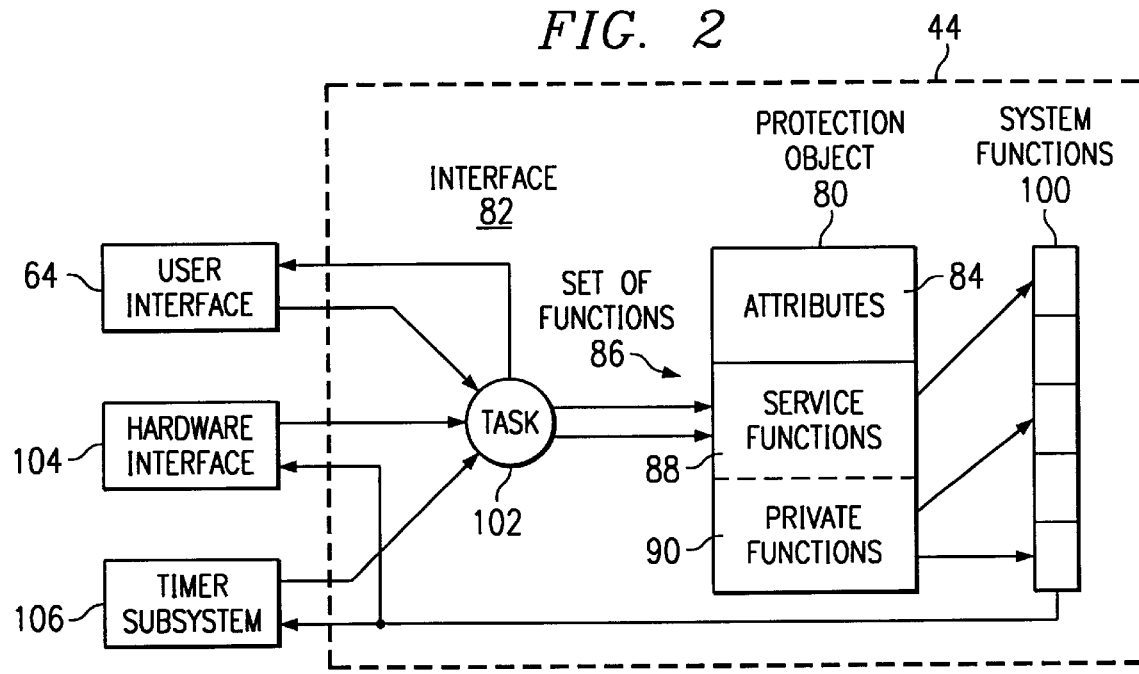
FIG. 2 is a detailed block diagram of the protection switching subsystem of FIG. 1, showing the attributes and the functions of the protection object.

As shown by FIG. 2, the protection switching subsystem 44 may comprise a protection object 80 and an interface 82. The protection object 80 may include a set of attributes 84 and a set of functions 86 in communication with the attributes 84. The attributes 84 are data elements in which switching state information of the network is stored.

The functions 86 may include a set of service functions 88 and a set of private functions 90. A function may be a program, a routine, a subroutine, or the like. The service functions 88 are functions invoked by the interface 82. The service functions 88 may accept switching state information from the interface 82, store that information to the attributes 84, and retrieve that information from the attributes 84.

The private functions 90 are utility functions invoked within the protection object 80. The private functions 90 may also retrieve switching state information from the attributes 84. The private functions 90 may be invoked by the service functions 88 or by another private function. Together, the service functions 88 and the private functions 90 perform the processing necessary for implementation of the predefined switching protocol. The service functions 88 and the private functions 90 also invoke a set of system functions 100 of the interface 82.

The interface 82 provides communication between the equipment of the network element 12 and the protection object 80. The interface may comprise the set of system functions 100 and a task 102. The task 102 may accept switching state information and switching events from the processors 36 of the tributary shelf 30 via a hardware interface 104. The task 102 may also accept switching state information and switching events from the operator station 72 via the user interface 64. The task 102 may invoke the service functions 86 of the protection object 80 and may pass switching state information to the protection object 80.

The system functions 100 of the interface 82 perform system-dependent actions, such as effecting switching operations of the network. The system functions 100 may also communicate with a timer subsystem 106 of the main processor 40 to start and cancel timers.

In accordance with the forgoing description of the protection switching subsystem 44, the protection object 80 completely implements the predefined protection switching protocol. The protection object 80 accepts switching state information from the task 102, makes switching decisions according to the predefined switching protocol, and invokes system functions to perform system-dependent actions. The interface 82 provides communications between the network and the protection object 80. Accordingly, the protection object 80 is of modular design and need not be customized for use with different types of telecommunications systems. Thus, the protection object 80 of the present invention eliminate the cost of such customization and is relatively inexpensive.

Moreover, the interface 82 of the present invention is greatly simplified. In particular, the complexities of a switching protocol are completely encompassed by the protection object 80. Thus, the interface 82 need only provide communications between the telecommunications system and the protection object.

The protection switching subsystem 70 is configured and operates in the same manner as above described protection switching subsystem 44. Thus, the protection switching subsystem 70 may be readily understood from the above description of the protection switching subsystem 44. Accordingly, for the convenience of the reader, the protection switching subsystem 70 is not separately described.

In one embodiment, the protection object 80 may implement the 1+1 mode of the Automatic Protection Switching (APS) protocol defined in Bellcore's GR-253-CORE (Synchronous Optical Network (SONET) Transport Systems; Common Genetic Criteria) and SR-NWT-1756 (Automatic Protection Switching for SONET), including uni-directional and bi-directional switching, both revertive and non-revertive. Further information regarding the 1+1 APS protocol and regarding Bellcore may be obtained from Bellcore at 8 Corporate Place, Room 3A-184, Piscataway, N.J. 08854-4156, 800/521-CORE.

A method for implementing the 1+1 APS embodiment is described below, with the attributes 84, the service functions 88, the private functions 90, and the system functions 100 listed and their processing described. In this embodiment, the protection object 80 may include the following attributes 84 listed below in TABLE 1.

TABLE 1

| | |
|---|---|
| object_id - | the unique identifier for the object. Since a subsystem may control multiple entities requiring 1 + 1 switching, multiple instances of the PO may be required. The PO passes this identifier as a parameter when it calls system functions to identify which object is requesting action |
| switch-mode - | the currently active switch mode (unidirectional or bidirectional) |
| provisioned_switch_mode - | the switch mode provisioned by the user - uni-directional or bi-directional. This can be different than the switch mode since the APS protocol specifies that both the near end and far end nodes must operation uni-directionally unless both are provisioned for bi-directional operation. |
| provisioned_architecture - | the switching architecture provisioned by the user - 1 + 1 or 1:1 (pronounced "1 for 1"). It is possible for the near end node to be provisioned for 1:1, yet operating in 1 + 1 mode, because the APS protocol specifies that both the near and far end must operate in 1 + 1 mode unless both ends are provisioned for 1:1 operation. |
| provisioned_revert_mode - | the revert mode provisioned by the user - revertive or non-revertive. |
| rxed_k1, rxed_k2 - | the current K1 and K2 bytes received from the far end. |
| txed_k1, txed_k2 - | the current K1 and K2 bytes being transmitted to the far end. |
| line_condition_save [2] - | the current condition of the working and protect lines; included in this attribute are the current state of the lines (unassigned, out-of-service; or in-service), the current alarm on the lines (none signal-degrade, or signal-fail), and the current bit error rate on the line (1E-4 to 1E-9), which only applies if the alarm on the line is signal-degrade. |
| switch_hold_counter - | the current number of switches that count toward the provisioned_switch_count_threshold. |
| provisioned_switch_count_threshold - | the number of switches provisioned by the user to cause the PO to enter the switch-hold state. |
| aps_byte_fail_condition - | the current AFS Byte Failure condition reported switching by the protection switching subsystem - ON or OFF. |

TABLE 1-continued

| | |
|---|---|
| provisioned_switch_hold_duration - | the length of a switch-hold (in minutes) provisioned by the user. This attributes is only needed because if it is set to zero, the PO must never enter the switch-hold sate. |

Under this embodiment, the object identification attribute is used because each protection switching subsystem may control multiple fiber pairs, therefore requiring multiple protection object per protection subsystem. In the network element 12 of FIG. 1, for example, the protection switching subsystem 44 of each tributary shelf 30 and the protection switching subsystem 70 of the common shelf 50 each include their own protection object 80. Each protection object 80 passes this identifier as a parameter when it invokes system functions 100 to identify which object 80 is requesting action.

The switch mode and the provisioned switch mode attributes may differ because the 1+1 APS protocol specifies that both the near and the far end elements in a telecommunications network must operate uni-directionally unless both are provisioned for bi-directional operation. Thus, the switch mode will be uni-directional even if the provisioned switch mode is bi-directional where the far end element is provisioned uni-directional.

The provisioned architecture attribute may be 1+1 or 1:1. The 1+1 APS protocol specifies that both near and far end elements must operate in 1+1 mode unless both ends are provisioned for 1:1 mode operation. Thus, it is possible for the provisioned architecture attribute to be 1:1 mode, but the element operating in 1+1 mode.

The line condition save attribute contains a current condition of the working and protect lines. This attribute includes the current state of the lines (unassigned, out-of-service, or in-service), the current alarm on the lines (none, signal-degrade, or signal-fail), and the current bit error rate of the line (1E-4 to 1E-9), if the alarm on the line is signal-degrade.

The provisioned switch-hold duration attribute may be set to zero to prevent the protection object 80 from entering the switch-hold state.

In the 1+1 APS embodiment, the protection object 80 may include the service functions 88 listed below in TABLE 2. For each service function 88, TABLE 2 includes the circumstance under which the function should be called by the protection switching subsystem and a description of the parameter. Additionally, a description of the processing that each function performs follows TABLE 2.

TABLE 2

| | |
|---|---|
| initialize (attributes, system_functions) - | this function is used to initialize the PO. The attributes parameter is a structure containing initial values for all of the attributes described above. The system_functions parameter is a structure containing the addresses of the system functions provided by the switching subsystem for the protection object to |

TABLE 2-continued

| | |
|---|---|
| | call, which are described in a subsequent section. |
| line_condition_change (line, condition, ber_level, state) - | this function is used to notify the protection object of changes in the conditions and states on the working and protection lines. The line parameter indicates whether the change is on the working or protect line; the condition parameter indicates the current alarm level of the line (none, signal-degrade or signal-fail); the ber_level parameter indicates the current bit error rate level of the line (only applies if the condition = signal-degrade); and the state parameter indicates the current service state of the line (unassigned, out-of-service, or in-service) |
| user_request (request) - | this function is used to notify the protection object of a user request that was received by the protection subsystem. The request parameter identifies the user request that was received. |
| switch_ok (request) - | this function is used to determine if a front panel switch request will be allowed. The request parameter identifies the front panel switch to be verified. |
| new_rxed_k1 (k1) - | this function is used to report a new, unsolicited K1 byte from the far end. The k1 parameter is the K1 byte that was received. |
| new_rxed_k2 (k2) - | this function is used to report a new, unsolicited K2 byte from the far end. The k2 parameter is the K2 byte that was received. |
| provisioning_change (attribute, value) - | this function is used to indicate that the value for one of the user-provisionable attributes changed. The attribute parameter indicates which attributed changed, and the value parameter is the new value for that attribute. |
| wait_to_restore_timer_expired() - | this function is used to indicate that the wait-to-restore timer expired. No parameters are required. |
| switch_hold_activity_timer_expired() - | this function is used to indicate that the switch-hold activity timer expired. No parameters are required. |
| switch_hold_duration_timer_expired() - | this function is used to indicate that the switch hold duration timer expired. No parameters are required. |
| aps_byte_fail_notification (state) - | this function is used to notify the protection object that the APS Byte Failure condition has set or cleared. The state parameter indicates whether the condition is currently on or off. |

The initialize function performs the following processing. Copy information from attributes and system_functions into local memory. If at least one of the lines is assigned, call analyze_k2modes( ) to determine what the active switching architecture (1:1 or 1+1) and mode (uni-directional or bi-directional) should be. If neither line is assigned, or the switching architecture should be 1:1, do nothing else. Call recover_switch_state ( ) to determine what K1 byte value the current line conditions dictate. If necessary, call compare_requests ( ) to compare this value with the current txed_k1 value if it contains a switch request. Call local_switch_request ( ) to set the initial switch state according to the local K1 value, or new_rxed_k1 ( ) to set the initial switch state according to the rxed_k1 value, depending on priority. Check for a channel mismatch and call the channel_mismatch_defect ( ) system function.

The line_condition_change function performs the following processing. Store the new condition, ber_level, and state in the line_condition_save attribute. Call recover_switch_state ( ) to determine what K1 byte value the current line conditions dictate. If necessary, call compare_requests ( ) to compare this value with the current txed_k1 value, or if operating in bi-directional mode, with the current rxed_k1 value if it contains a switch request. If the new K1 is high enough priority, call local_switch_request ( ) to execute the switch.

The possible values of the request parameter of the user_request function are:

TL1 Clear—request to release a switch (received from TL1 command)

Front Panel Clear—request to release a switch (received from front panel control interface)

Manual Switch to Working—switch to the working line (manual priority)

Manual Switch to Protect—switch to protect line (manual priority)

Forced Switch to Working—switch to the working line (forced priority)

Forced Switch to Protect—switch to the protect line (forced priority)

Lockout—lockout from protection

Exercise—perform a switch exercise

The user_request function performs the following processing. If request is TL1 or Front Panel Clear, call recover_switch_state ( ) to get the new state, and call local_switch_request ( ) to execute the switch. Otherwise, call compare_requests ( ) to see if the request has high enough priority to override the current switch state, and if it does, call local_exercise_request ( ) if the request is Exercise, or local_switch_request ( ) if it is anything else.

The possible values of the request parameter of the switch_ok function are:

Front Panel Clear

Manual Switch to Working

Manual Switch to Protect

The switch_ok function performs the following processing. If request is Front Panel Clear, return YES if current switch state is manual-switch or wait-to-restore; else return NO. If request is a manual-switch, call compare_requests ( ) to determine if the switch can override the current switch state. Return YES if so, NO otherwise.

The new_rxed-k1 function performs the following processing. Save k1 in the rxed_k1 attribute. If operating in uni-directional mode, do nothing else. If k1 is invalid, call the aps_byte_fail_detect ( ) system function to report it. If k1 is a signal-fail-protect, call the feprlf_defect ( ) system function to notify the switching subsystem of that defect. If the far end request is a clear condition, call recover_switch_state ( ) to see if the near end has a switch to request. Else, if the near end is currently sourcing a switch request, call compare_requests ( ) to see if the far end request overrides its. Depending on the outcome of the above checks, either call far_end_switch_request ( ) to execute the switch requested by the far end, or local_switch_request ( ) to execute a near end switch.

The new_rxed-k2 function performs the following processing. Save k2 in the rxed_k2 attribute. Call analyze_k2_modes ( ) to process the byte.

The provisioning_change function performs the following processing. The possible attributes, and the processing performed for each are listed below:

Switch Count Threshold—store the value in the provisioned_switch_count_threshold attribute, reset the switch_hold_counter attribute to zero, and call switch_hold_activity_timer ( ) to cancel the timer.

Switch Hold Duration—store the value in the provisioned_switch_hold_duration attribute.

Revert Mode—store the value in the provisioned_revert_mode attribute; if txed_k1 indicates that a wait-to-restore is active, and the new mode is non-revertive, call local_switch_request ( ) to release the switch; and if txed_k1 indicates that a do-not-revert condition is active, and the new mode is revertive, call local_switch_request ( ) to release the condition.

Switch Mode—store the value in the provisioned_switch_mode attribute; call the send_new_k2( ) system function to transmit a new K2 byte indicating the new mode; and call analyze_k2_modes ( ) to see if the active switch mode should be changed.

The wait_to_restore_timer_expired ( ) function performs the following processing. If the txed_k1 attribute indicates that a wait-to-restore condition is active, call local_switch_request ( ) to release the switch.

The switch_hold_activity_timer_expired ( ) function performs the following processing. Reset the switch_hold_counter attribute to zero.

The switch_hold_duration_timer_expired ( ) function performs the following processing. If the txed_k1 attribute indicates that a switch-hold condition is active, call recover_switch_state ( ) to determine what the new switching state should be, and call local_switch_request ( ) to execute that switch.

The aps_byte_fail_notification (state) function performs the following processing. Save the new state in the aps_byte_fail_condition attribute. If the active switch mode is uni-directional, do nothing else. If the condition is turning on, call compare_requests ( ) to verify that a signal-fail-protect switch will override the current switch state, and if so, call local_switch_request ( ) to perform the switch. If the condition is turning off, call recover_switch_state ( ) to determine the state to which the protection object should release the signal-fail-protect switch, and call local_switch_request ( ) to execute the switch.

In the 1+1 APS embodiment, the protection object 80 may include the private functions 90 listed below in TABLE 3. These functions are called to perform common tasks. For each private function 90, TABLE 3 includes the circumstances under which the function should be called and a description of the parameters. Additionally, a description of the processing that each function performs follows TABLE 3.

TABLE 3

| | |
|---|---|
| compare_requests (new_k1, reference_k1) - | this function is called to determine if a new switch request will override an existing switching condition. The new_K1 parameter is the K1 byte representing the new switching request, and the reference_k1 is the K1 byte representing the current switching condition. |
| valid_k1_response (k1) - | this function is called to determine if a K1 byte received from the far end in response to a local switch request is valid. The k1 parameter is the K1 byte that was received. |
| recover_switch_state () - | this function is called to generate a K1 byte that summarizes the current states and alarms on the lines as stored in the line_condition_save attribute. No parameters are necessary. |
| analyze_k2_modes() - | this function is called to determine if the switching architecture or mode should change when a new K2 byte is received or the provisioned values change. No parameters are necessary. |
| switch_complete (old_txed_k1) - | this function is called at the end of a switch to update attributes as necessary and to check to see if switch-hold should be entered. The old_txed_k1 parameter is the previous value of the txed_k1 attribute (before the current switch occurred). |
| far_end_switch_request() - | this function is called to execute a switch requested by the far end. No parameters are necessary. |
| local_switch_request (k1, exercising) - | this function is called to execute a switch requested by the near end. The k1 parameter gives the switch that is to be executed, and the exercising parameter indicates whether or note a switch exercise is in progress. |
| local_exercise_request (k1) - | this function is called to execute a switch exercise. The k1 parameter gives the K1 byte that is to be sent to perform the exercise; possible values are exercise-working or exercise-protect. |
| change_switch_mode (new_mode) - | this function is called to change the active switch mode. The new_mode parameter identifies the mode to which to change - - - uni-directional or bi-directional. |

The compare_requests function performs the following processing. If reference_k1 is a lockout indication, return NO; else if new_k1 is lockout, return yes. If reference_k1 is signal-fail-protect, return NO; else if new_k1 is signal-fail-protect, return YES. If priority code of reference_k1 is higher than that of new new_k1, return NO; else if priority code of new_k1 is higher than that of reference_k1, return YES. Otherwise priorities are the same, so if the channel in new_k1 is lower than that in reference_k1, return YES; else return NO.

The valid_k1_response function performs the following processing. If the txed_k1 attribute is no-request, then if k1 is also no-request, return YES; else if it's reverse-request, return NO; else return FAR_END_PREEMPT. Else txed_k1 represents a switching request, so if k1 is reverse-request, return YES; else call compare_requests ( ) to see if k1 is higher priority than txed_k1, and if it is, return FAR_END_PREEMPT; otherwise return NO.

The recover_switch_state function performs the following processing. If the protect line is not in-service or has a signal-fail condition, or the switch_mode attribute is bi-directional and the aps_byte_fail_condition attribute is ON, return signal-fail-protect; else if the working line is not in-service, return signal-fail working. Else, both lines are in service, so compare the alarms on the lines and if the protect line alarm is more severe, return signal-fail-protect or signal-degrade-protect. Else if the working alarm is more severe, return signal-fail-working or signal-degrade-working. Else the alarms are the same, so if they are signal-fail, return signal-fail-protect. Else if they are signal-degrade, return signal-degrade-working or signal-degrade-protect, depending on which ber_level is worse. If neither line has an alarm, return no-request, do-not-revert, or wait-to-restore depending on the txed_k1 and provisioned_revert_mode attributes.

The analyze_k2_modes function performs the following processing. If the provisioned_architecture and rxed_k2 attributes both indicate 1:1 switching, call the active_switch_architecture_changed ( ) and active_switch_mode_changed ( ) system functions to notify the protection switching subsystem that 1:1 bi-directional switching should be used, and return 1:1 and bi-directional. Otherwise, if either attribute indicates 1:1 switching, return 1+1 and uni-directional. Otherwise, both ends are provisioned for 1+1, so if the provisioned_switch_mode and rxed_k2 attributes both indicate bi-directional, return 1+1 and bi-directional; else, return 1+1 and uni-directional. Call the change_switch_mode_changed ( ) system function to indicate the current mode, and the mode_mismatch_defect ( ) system function to indicate whether or not a mismatch exists.

The switch_complete function performs the following processing. If the new switch requires the selector to move due an automatic switch request (as opposed to a user request), increment the switch_hold_counter attribute. If the new count has reached the provisioned_switch_count_threshold and the provisioned_switch_hold_duration is not zero, call compare_requests ( ) to see if the switch-hold condition will override the current request. If so, set a flag so that the switch-hold will be performed at the end of this function (after the current switch is completed). If old_txed_k1 is wait-to-restore, call the wtr_duration_timer ( ) system function to cancel the timer. If old_txed_k1 is switch-hold, call the switch_hold_duration_timer ( ) system function to cancel the timer. If the txed_k1 attribute (the new switching state) is wait-to-restore, call the wait_to_restore_timer ( ) system function to start the timer. If the txed_k1 attribute is switch-hold, reset the switch_hold_counter attribute to zero, call the switch_hold_activity_timer ( ) system function to cancel the timer, and call the switch_hold_duration_timer ( ) to start the timer. If the switch-hold flag was set above, call local_switch_req ( ) to execute the switch-hold.

The far_end_switch_request ( ) function performs the following processing. Determine the appropriate K1 byte response. If the channel in the rxed_k1 and txed_k1 attributes do not match, call the change_selector_and_send_k1 ( ) system function to execute the switch and send a new K1 byte; call the send_new_k2 ( ) system function to send a new K2 byte; call the wait_for_k1_k2 ( ) system function to wait on the K2 byte from the far end, and call analyze_k2_modes ( ) to process the new K2 byte. If the channels do match, just call the send_new_k1 ( ) system function to send a new K1 byte.

The local_switch_request function performs the following processing. If the channels in k1 and the txed-k1 attribute do not match, call the change_selector_and_send_k1 ( ) system function to execute the switch and send a new K1 byte to the far end. If the channels do match, call the send_new_k1 ( ) system function to send a new K1 byte only. Set the txed_k1 attribute to k1 If provisioned for bidirectional operation, call the wait_for_k1_k2 ( ) system function to wait on the K1 and possibly K2 bytes from the far end. If the return code indicates that the byte(s) were not received, call the aps_byte_fail_defect ( ) system function to indicate the APS Byte Failure. If the return code indicates that the byte(s) were received, call valid_k1_response ( ) to analyze the response. If the return code from this call is FAR_END_PREEMPT, call the new_rxed_k1 ( ) service to process the far end switch request. If the return code is NO (response was not valid), call the aps_byte_fail_defect ( ) system function to indicate the APS Byte Failure. If a K2 byte was received from the far end, call analyze_k2_modes ( ) to process the byte. Regardless of uni-directional or bi-directional operation, if the k1 and txed_k1 channels do not match, call the send_new_k2 ( ) system function to send a new K2 byte to the far end.

The local_exercise_request function performs the following processing. Save the current txed_k1 attribute value, and set the return value to SUCCESS. Call local_switch_request ( ) and set the exercising parameter to TRUE. Call valid_k1_response ( ) to verify the K1 response from the far end, and if it is invalid, set the return value to FAILURE. Call local_switch_request ( ) to retransmit the original txed_k1 value. Call valid_k1_response ( ) to verify the K1 response from the far end, and it if is invalid, set the return value to FAILURE. Return the return value.

The change_switch_mode function performs the following processing. If new_mode is uni-directional, and the txed_k1 byte is reverse-request, call recover_switch_state ( ) to determine what the new switch state should be, and call local_switch_request ( ) to execute that switch. Call the aps_byte_fail_defect ( ), channel_mismatch_defect ( ), and feprlf_defect ( ) system functions to ensure these three defects are OFF. If new_mode is bi-directional, call new_rxed_k1 ( ) to process the far end K1 byte. Regardless of uni-directional or bi-directional, call the active_switch_mode_changed ( ) system function to notify the protection switching subsystem that the switch mode has changed.

The above listed and described service functions 88 and private functions 90 together completely implement the 1+1 APS protocol. In this embodiment, the interface 82 may include the system functions 100 listed below in TABLE 4. These functions are provided by the interface 82 of the protection switching subsystem for the protection object 80 to call. The following information is included for each: the circumstances under which the protection object will call the function, a description of the parameters, and a description of the processing performed by the function. Note that the object_id attribute is passed as the first parameter to each of these functions to identify the protection object that is requesting the action. It will not be shown in the parameter lists.

TABLE 4

| | |
|---|---|
| change_selector_and_send_k1 (k1) - | this function will be called to execute a switch - it must interface with the hardware to physically move the selector (which performs the switch) and to transmit a new K1 byte to the far end. The k1 parameter is the K1 byte that represents the switch to perform. |
| send_new_k1 (k1) - | this function will be called when a new K1 byte must be sent - it must interface with the hardware to transmit a new K1 byte to the far end. The k1 parameter is the byte to send. |
| send_new_k2 (k2) - | this function will be called when a new K2 byte must be sent - it must interface with the hardware to transmit a new K2 byte to the far end. The k2 parameter is the byte to send. |
| active_switch_architecture_changed(switch_hold_counter) - | this function is called to indicate that the active switch architecture has changed to 1:1 - if the protection switching subsystem also supports the 1:1 architecture, then it should take control of the APS switching protocol at this point, since the protection object only supports 1 + 1. The switch_hold counter parameter is the current switch hold count, in case the protection switching subsystem wants to maintain it for 1:1 switching. |
| active_switch_mode_change (switch_mode) - | this function is called to indicate that the active switch mode has changed - the protection switching subsystem may or may not do anything with this information. The switch_mode parameter indicates the new mode - uni-directional or bi-directional. |
| switch_hold_duration_timer (action) - | this function is called to start or cancel the switch_hold duration timer. the action parameter indicates whether the timer should be started or canceled. |
| switch_hold_activity_timer (action) - | this function is called to start or cancel the switch hold activity timer. the action parameter indicates whether the timer should be started or canceled. |
| wait_to_restore_timer action) - | this function is called to start or cancel the wait_to_restore duration timer. The action parameter indicates whether the timer should be started or canceled. |
| wait_for_k1_k2 (k_bytes_accepted, k1, k2) - | this function is called to wait on the receipt of one or both of the K bytes from the far-end after a near-end |

TABLE 4-continued

| | |
|---|---|
| | initiated switch in bi-directional mode - the protection switching subsystem must wait for notification that the K byte(s) have been received from the far end. The return value must indicate that a timeout occurred or which K bytes were received. The k_bytes_accepted parameter indicates which K bytes the protection object expecting, and the k1 and k2 parameters are the locations in which the function should place the received K bytes. |
| aps_byte_fail_defect(state) - | this function is called to indicate that the APS Byte Failure defect has occurred or cleared - the state parameter indicates whether the transition is on or off. The protection switching subsystem must integrate this defect for 2.5 seconds to declare an APS Byte Failure condition, and for 10 seconds to clear an APS Byte Failure condition. At the end of these integration periods, the subsystem should call the PO's aps_byte_fail_notification() service and report the condition transition to the user. |
| channel_mismatch_defect (state) - | this function is called to indicate that the Channel Mismatch defect has occurred or cleared - the state parameter indicates whether the transition is on or off. The protection switching subsystem must integrate and deintegrate as it does for APS Byte Failure, and also report the condition transition to the user. |
| mode_mismatch_defect(state) - | same as channel_mismatch_defect(), but used for the Mode Mismatch defect. |
| feprlf_defect(state) - | same as channel_mismatch_defect(), but used for the Far End Protection Line Failure defect. |

Those skilled in the art will understand that the method of the present invention may include error branches that cause the method to abort if an error condition such as the lack of free memory or the like exists. Such error branches are well known in the art and are not directly related to the present invention. Accordingly, they will not be further described.

From the foregoing description of the present invention, other alternative constructions may suggest themselves to those skilled in the art. Therefore, the scope of the present invention is to be limited only by the claims below and the equivalence thereof.

What is claimed is:

1. A protection switching subsystem, comprising:
a computer directed by a protection object, comprising:
a storage device operable to store data;
a memory operable to store the protection object; and
a processor coupled to the storage device and the memory wherein the processor is operable to execute the protection object;

a system-independent protection object comprising:
a set of attributes to the store switching state information of a telecommunications system; and
a set of modular functions in communication with the attributes, wherein the protection object is operable to:
accept switching state information of the telecommunications system;
store switching state information to the attributes;
retrieve switching state information from the attributes;
implement a predefined protection switching protocol; and
invoke a set of system functions; and
an interface to communicate between the telecommunications system and the protection object, the interface operable to:
accept switching state information and switching events of the telecommunications system;
pass switching state information to the protection object system;
invoke functions of the protection object associated with the switching events; and
effect system-dependent switching operations of the telecommunications system.

2. The protection switching subsystem of claim 1, wherein the modular functions comprise:
a set of service functions to accept switching state information of the telecommunications system, to store switching state information to the attributes, to retrieve switching state information from the attributes, and to invoke a set of private functions;
the service functions and the private functions operative to implement the predefined protection switching protocol of the hardware of the telecommunications system and to invoke the system functions.

3. The protection switching subsystem of claim 1, further comprising the predefined protection switching protocol being a 1+1 mode of the Automatic Protection Switching (APS) protocol defined by Bellcore for a Synchronous Optical Network (SONET).

4. The protection object of claim 1, wherein a system function is invoked by the protection object.

5. The protection object of claim 2, wherein a private function is further operable to invoke another private function and to retrieve switching state information from the attributes.

6. A shelf of a telecommunications system comprising:
a data path module coupled to a communication link, the data path module including a processing chip in communication with a processor, the processor operative to monitor the communication link and the processing chip for switching information and switching events; and
a protection switching subsystem to accept switching information and switching events from the processor, comprising:
a protection object including:
a set of attributes to the store switching state information of said telecommunications system; and
a set of modular functions in communication with the attributes, wherein the set of modular functions are operable to direct a computer in the protection system subsystem to to accept switching state information of said telecommunications system, to store switching state information to the attributes, to retrieve switching state information from the attributes, to implement a predefined protection switching protocol, and to invoke a set of system functions; and an interface to communicate between the processor and the protection object, the interface comprising:

a task to accept switching state information and switching events of the processor, to pass switching state information to the protection object, and to invoke functions of the protection object associated with the switching events; and the set of system functions operative to effect system-dependent switching operations of said telecommunications system.

7. The shelf of claim 6, wherein the modular functions of the protection object comprise:

a set of service functions to accept switching state information of said telecommunications system, to store switching state information to the attributes, to retrieve switching state information from the attributes, and to invoke a set of private functions;

the service functions and the private functions operative to implement the predefined protection switching protocol of the hardware of the telecommunications system and to invoke the system functions.

8. The shelf of claim 6, further comprising the predefined protection switching protocol being a 1+1 mode of the Automatic Protection Switching (APS) protocol defined by Bellcore for a Synchronous Optical Network (SONET).

9. The shelf of claim 1, wherein a system function is invoked by the protection object.

10. The shelf of claim 7, wherein a private function is further operable to invoke another private function and to retrieve switching state information from the attributes.

11. The shelf of claim 6, further comprising an operator station in communication with the protection switching subsystem, the protection switching subsystem to accept switching events from the operator station.

12. The shelf of claim 11, further comprising a serial connection coupled between the protection switching subsystem and the operator station.

* * * * *